(12) United States Patent
Adams et al.

(10) Patent No.: US 6,458,283 B1
(45) Date of Patent: Oct. 1, 2002

(54) LOST CIRCULATION FLUID TREATMENT

(75) Inventors: Thomas C. Adams, Hockley, TX (US); David W. Largent, Cleveland, TX (US); David L. Schulte, Broussard, LA (US)

(73) Assignee: Varco I/P, Inc., Houston, TX (US)

( * ) Notice: Subject to any disclaimer, the term of this patent is extended or adjusted under 35 U.S.C. 154(b) by 6 days.

(21) Appl. No.: 09/749,263

(22) Filed: Dec. 27, 2000

Related U.S. Application Data

(63) Continuation-in-part of application No. 09/432,959, filed on Nov. 3, 1999, now Pat. No. 6,237,780, and a continuation-in-part of application No. 09/745,279, filed on Dec. 20, 2000, now Pat. No. 6,371,306.

(51) Int. Cl.[7] .......................... B07B 1/49; B01B 39/08; B01B 39/10; E21B 21/06
(52) U.S. Cl. .................. 210/780; 210/785; 210/388; 210/489; 210/492; 210/499; 209/401; 175/66; 175/72
(58) Field of Search ................. 210/780, 785, 210/388, 489, 492, 499; 209/401; 175/66, 72

(56) References Cited

U.S. PATENT DOCUMENTS

| | | |
|---|---|---|
| 2,929,464 A | 3/1960 | Sprouse |
| 3,716,138 A | 2/1973 | Lumsden ............ 209/401 |
| 4,696,751 A | 9/1987 | Eifling |
| 5,876,552 A | 3/1999 | Bakula |
| 5,921,399 A | 7/1999 | Bakula ............ 209/272 |
| 5,944,197 A | 8/1999 | Baltzer et al. |
| 6,237,780 B1 | 5/2001 | Schulte |

OTHER PUBLICATIONS

The Right Screen Makes the Difference, CPI Group Inc Oilfield Solids Control Division, 190.
Lost circulation technique can solve drilling problems, Messenger, The Oil & Gas Journal, pp. 94–98, May 27, 1968.
How to combat lost circulation, Messenger, The Oil & Gas Journal, pp. 71–97, May 13, 1958.
Manual of Drilling Fluids Technology, Lost Circulation, NL Baroid/NL Industries, Inc., 1988.
Southwestern Wire Cloth Oilfield Screens, Mar., 1998.

*Primary Examiner*—Thomas M. Lithgow
(74) *Attorney, Agent, or Firm*—Guy McClung

(57) ABSTRACT

A method for separating fluid and fibrous lost circulation material from a mixture thereof that also includes drilled cuttings, the method including introducing the mixture onto a screen assembly that is vibrating for passage of the fluid and fibrous lost circulation material through the screen assembly and for separation of the driled cuttings from the fluid, the screen assembly with a plurality of screens one on top of the other and including at least a first screen and a second screen, one of the screens with a screen mesh with non-square openings as viewed from above to facilitate the passage of fibrous lost circulation material through the screen assembly.

17 Claims, 8 Drawing Sheets

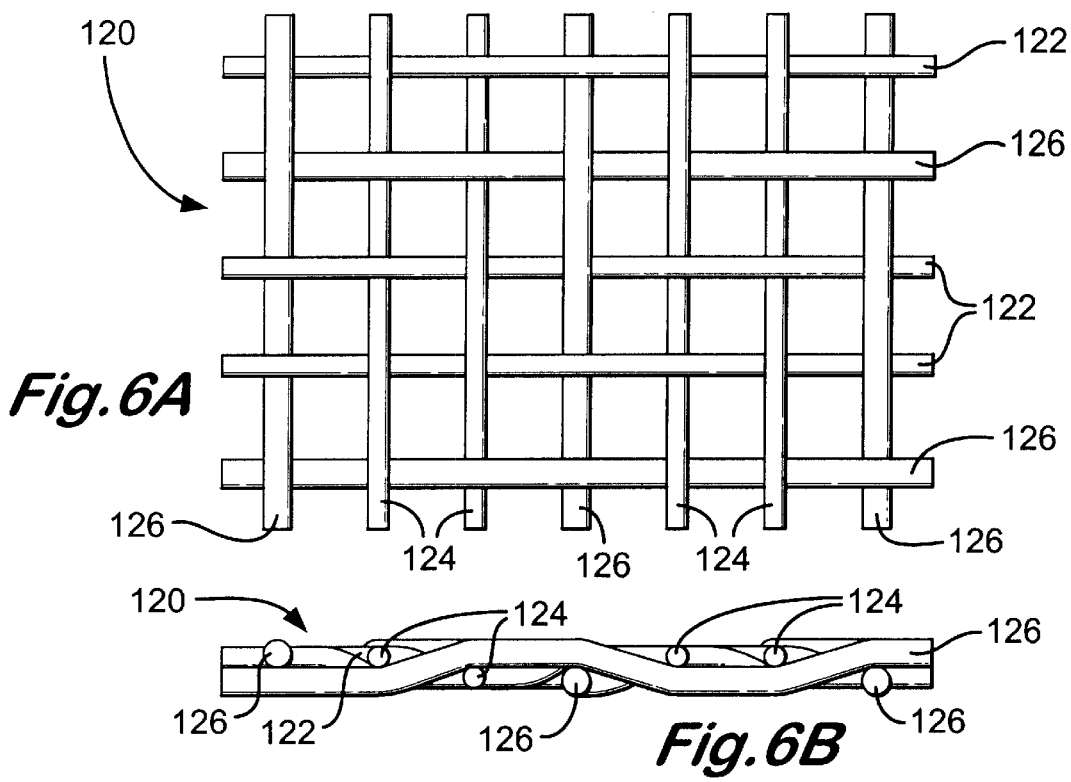
Fig.6A
Fig.6B
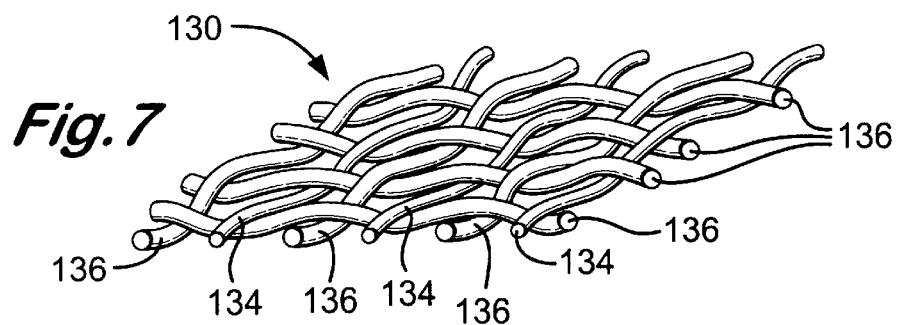
Fig.7
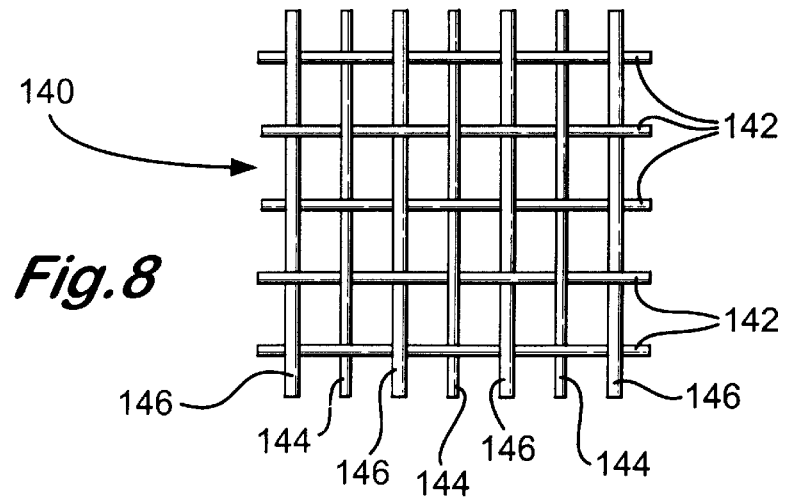
Fig.8

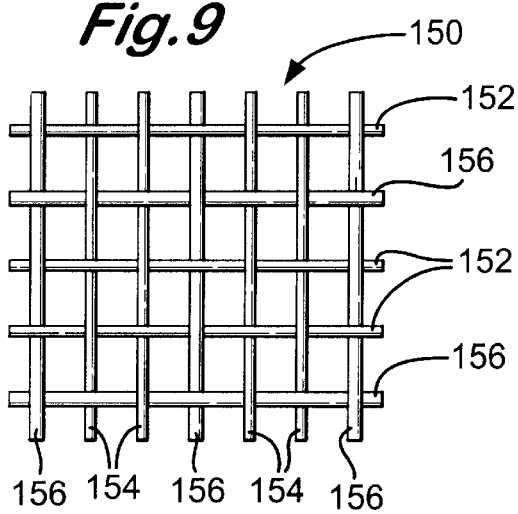
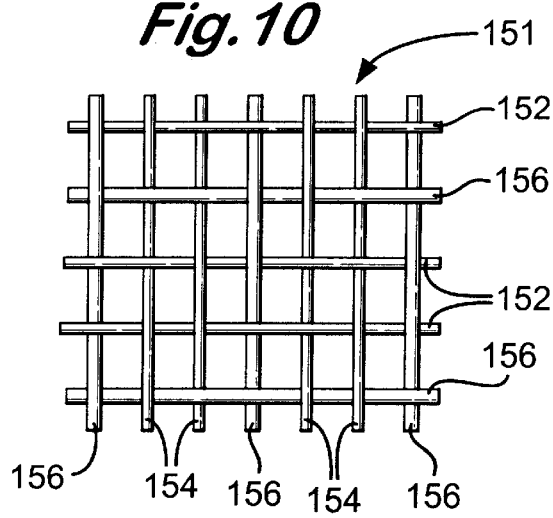
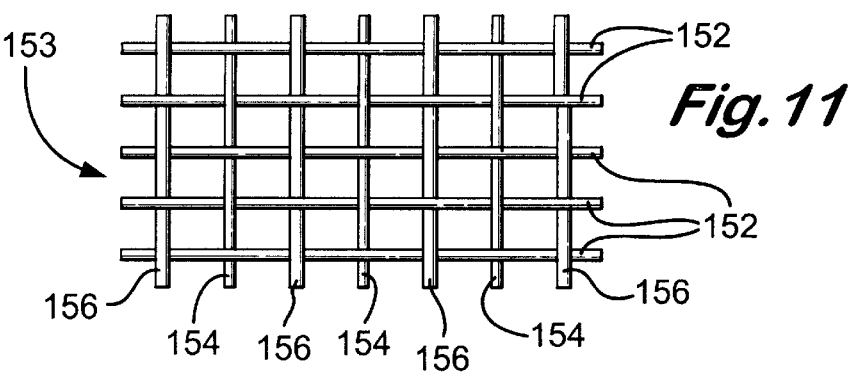
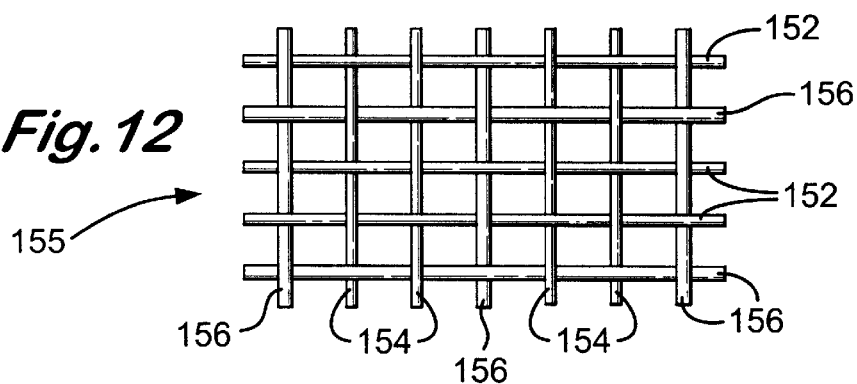
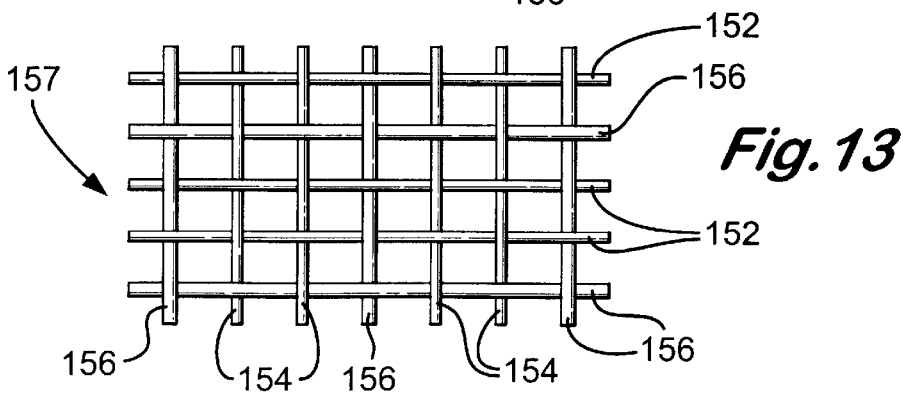

LOST CIRCULATION FLUID TREATMENT

RELATED APPLICATION

This is a continuation-in-part of U.S. Ser. No. 09/432,959 (U.S. Pat. No. 6,237,780) filed Nov. 3, 1999, and a continuation-in-part of U.S. application Ser. No. 09/745,279 filed Dec. 20, 2000 entitled "Lost Circulation Fluid Treatment" (U.S. Pat. No. 6,371,306) co-owned with the present invention and application and both incorporated fully herein for all purposes.

BACKGROUND OF THE INVENTION

1. Field of the Invention

This invention is directed to methods for separating drilling fluid from a mixture of such fluid and lost circulation materials and to apparatuses useful in such methods.

2. Description of Related Art

Often in drilling a wellbore, the circulation of drilling fluid to and then away from the drill bit ceases due to the porosity of the formation and/or due to fracturing of the formation through which the wellbore is being drilled. Drilling fluid pumps into the fractured formation rather than being returned to the surface. When circulation is lost, it is usually supposed that the lost circulation occurred at some specific depth where the formation is "weak", and that the fracture extends horizontally away from the borehole. Expressions used to describe rocks that are susceptible to lost returns include terms like vugular limestone, unconsolidated sand, "rotten" shale, and the like. Whether fractures induced by excessive mud pressure are parallel to the axis of the borehole (vertical) or perpendicular to the axis of the borehole (horizontal) is a subject of some controversy.

To fill or seal off a porous formation or to fill or seal off a wellbore fracture so that a proper route for drilling fluid circulation is re-established, a wide variety of "lost circulation materials" have been pumped into wellbores. For purposes of classification, some lost circulation materials can generally be divided into fibers, flakes, granules, and mixtures.

The choice of lost circulation material to use in a given case is influenced to some degree by cost and availability in a given drilling area. Cottonseed hulls, for example, are used widely in areas where cotton is grown and drilling in the same area involves mud loss to permeable and cavernous formations. Sawdust is used in areas where lumber is manufactured. Coarse granular material (¼ inch or ½ inch walnut or pecan shells), coarse fiber (shredded hard wood or cedar), medium fiber (shredded redwood or sugar cane), fine fiber (leather, flax, nylon, asbestos) and coarse flake (1 inch cellophane flake) have also been used.

With the bridging agents available today which can be applied through the mud pumps, mud losses to natural and induced fractures, up to ¼ inch in width, can be plugged. Beer bottles have been successfully applied to a severe loss zone as bridging agents directly down a hole. Rigid hollow objects filled with drilling fluid or a lighter liquid would be strong enough and yet have a density near that of the mud, making it possible for the flow of mud to carry them intact to restrictions in the loss zone. Granular lost circulation material also includes coarse walnut or almond shells—up to ¼ inch to ½ inch in size; coarse-to-medium wood or cane fiber, medium-to-fine fiber, e.g. wood, cane, nylon, leather; and large cellophane flakes.

The evaluation of lost circulation materials is based on performance tests. In these tests, mud containing lost circulation material is applied under pressure to a simulated formation. Observations are made as to the efficiency of the seal formed at or in a fracture at various concentrations of additive, and the volume of mud lost before a seal is effected. Fibers and flakes have been found to be effective for stopping loss in a highly permeable type of formation, and FIBERTEX™, HYSEAL, and JELFLAKE™ materials that are commercially available are in general use for the same type of loss in the field. Other known lost circulation materials include mica, cellophane, perlite, bagasse fiber, nut shells, feathers, textile fiber blend, and granular materials. Granular materials are more effective than fibers or flakes in some instances for sealing fractures at high pressure. Often the width of fracture that can be sealed depends upon concentration, as well as type, of sealing material. Accordingly, WALL-NUT™ material is used routinely for combating loss of weighted mud because weighted mud tends to induce fracturing of a formation. A general purpose lost circulation material may be characterized by the following criteria: it should contain high-strength granules with a definite size distribution; it should form a seal at both high and low differential pressures; and it should be equally effective in sealing unconsolidated formations and fractures or voids in hard formations.

In one prior art material a mixture of fibers, flakes and granules called KWIK-SEAL™ material is used. Often high filtrate squeezes for lost circulation depend upon tightly packed and substantially dehydrated solids to effect a required seal. This approach to combatting lost returns may be used in either high pressured or normally pressured drilling areas. Other prior art lost circulation materials are commercially available FLOSAL™, HY-SEAL, ZEO-GEL™ materials (in proper concentration). In some methods lost circulation materials are mostly granular when drilling with heavy mud, and mostly fibers and flakes when drilling with low-density mud.

A great variety of materials, mixtures and formulas that are pumpable at the surface and develop shear-strength when pumped into place downhole have been used for curing lost circulation. Often an amount of such a material pumped into a wellbore is referred to as a "plug". The plug may develop a "rubbery gel" or a "putty-like consistency," and breathe" as varied pressures are imposed on natural and induced fractures in the formation. Some as a class have acquired the generic label of "gunk."

One common plug uses bentonite and diesel oil as a base. With certain lost circulation materials, cement and polymers have been added as refinements for some applications. Various ingredients for such a plug are referred to as: DOB=diesel oil bentonite; M-DOB=mud-diesel oil bentonite; DOBC=diesel oil bentonite cement; and M-DOBC= mud-diesel oil bentonite cement. In certain applications diesel oil is used as spacer between gunk and mud or water. The DOB or DOBC slurry is pumped to the bottom of the drill pipe (which is placed somewhat above the loss zone, or at the bottom of the last casing), rams are closed, and the gunk followed by water is squeezed into the formation, or mud is pumped from the annulus as gunk is pumped from the drill pipe and the mixture is squeezed into the formation. Various polymers have been substituted for part of the bentonite in the gunk formula with the hope that the "rubberiness" of the gel and the "breathability" of the plug will thus be enhanced.

When circulation is lost while drilling with oil mud, the same type of squeeze can be applied using water as the continuous liquid, with GELTONE™ commercially available material instead of bentonite as the critical solid in the slurry. High-shear strength is imparted to the slurry when the GELTONE becomes wetted with oil.

Typical known shale shaker screens or screen assemblies with square mesh openings often are clogged or plugged when attempts are made to separate lost circulation materials from a mixture of them with fluid that has been pumped down a wellbore. Stringy, fibrous, and/or fibril material ("fibrous" material) can wrap around a wire of a screen and/or bridge a mesh opening without passing through the screen. In certain particular circumstances there have been problems with commercially available ULTRA-SEAL lost circulation material that has fibrous material in it. If components of this material which swell are caught between two screen mesh layers, they swell and plug the screen rather than going through the screen with the drilling fluid (while drilled cuttings, debris, etc. move on the top of the sceen assembly and exit the shaker or vibratory separator apparatus). Although the prior art discloses the use of screens with non-square openings for use on shale shakers for treating mixtures of drilling fluid and drilling solids, the present inventors are unaware of the use of prior art screen (s) and/or screen assemblies with non-square mesh openings in methods for separating fluid and fibrous lost circulation materials from drilled cuttings and believe it is not obvious to use screens with non-square openings with relatively more opening area to successfully treat such fluids.

Various woven cloth screens for vibratory separators are used in removing particles from a liquid and are designed to provide a tortuous path for the liquid. Many prior art woven cloths, including the typical weave, twill, dutch weave or twill dutch weave cloths have low fluid conductance characteristics due to the formation of the tortuous flow path. A minimal rate of flow results in a correspondingly slow filtering process. Often the screens need frequent cleaning to maintain a desired flow rate.

Certain prior art screens provide an open surface area and permit direct or nontortuous flow through the screen. Such screens may provide better conductance characteristics, but the fluid conductance may be limited by the permissible ratio of length to width in the interstices between the screen filaments and the fineness of the filaments. With increasing spacing between filaments, deformation of the filaments from the parallel may increase and larger than desired particles can then pass through the screen. To maintain an efficient relationship, the size of the rectangular interstices in these screens is generally minimal and the length to width ratio is generally less than three unless coarse, stiff filaments are used. Higher ratios can be achieved by bonding together the crossing filaments of the screen; but bonding can be a complex and costly process with negative side effects. By coating the filaments with a bonding material, the diameter of the filaments is increased, further reducing fluid conductance of the screen.

Particle separation, fluid throughput or conductance and screen life are important characteristics of screens for vibratory separators. Finer particle separation results in a higher percentage of impurities being removed from the screened fluid. Higher conductances are desirable because more fluid can be processed per square foot of screen area, thereby reducing costs. Doubling conductance doubles the liquid throughput. Longer screen life saves time and money. Since the mid-seventies one vibrating screen industry trend has been to decrease wire diameter in order to achieve higher conductance. For certain prior art screens this has means finer separation and higher conductance but shorter screen life. To increase screen life, the industry has tried various types of bonded screens such as plastic-backed, metal-backed backed or bonded-backup. These bonded screens are relatively expensive. U.S. Pat. Nos. 5,370,797; 5,256,291; and 5,256,292 disclose double shute or warp screens with a double warp plain weave screen having warp and shute wires of the same material and properties, the shute diameter at least 1.4 times the warp diameter to prevent sleaziness. If the shute diameter controls the conductance and if the shute diameter is fine enough to give very high conductance, the warp diameter is so fine that the screen has a low tensile strength and therefore shorter life; and screens for removing undesirable particles from a liquid in which a substantially flat parallel array of shute filaments are spaced at less than a preselected minimal linear dimension of undesirable particles and a parallel array of groups of warp filaments runs transverse to the shute filaments. The warp filaments of each group are oppositely woven about and between the shute filaments taken individually or in pairs to secure the shute filaments and maintain the spaces therebetween. The groups of shute filaments have spaces therebetween smaller than the preselected minimal linear dimension of the undesirable particles so that the screen is characterized by elongated rectangular flow apertures therethrough. Each group includes from 3 to 10 or more warp filaments and the shute filament diameters are as small as in the order of 1.1 times the warp filament diameter. Conductance is increased by making the rectangular apertures longer. The life of the screen is increased by increasing the number of warp wires to achieve the required tensile strength. Finer particle separation is achieved by making the short dimension of the rectangle smaller. Screens formed by this weaving of groups of three or more warp filaments transverse to shute filaments which are as small as in the order of 1.1 times the diameter of the warp filaments provide meshes having relatively higher aspect ratios with smaller filament diameters than with certain known weaves of filaments of this range of diameter.

FIGS. 1A and 1B show a prior art screen 22 as disclosed in U.S. Pat. No. 2,723,032 with a coarse mesh wire screen, or cloth 23 that provides a backing screen or cloth of the unit. A fine mesh wire screen 24 is superimposed or mounted upon the backing screen 23. The screen unit 22 has its coarse backing wire mesh or cloth coated or covered preferably with rubber or some suitable rubber or synthetic rubber composition. The strands are indicated at 25 and the covering or coating at 26. Since all of the strands 23 are coated or covered, there is, of course, rubber-to-rubber contact between these strands of the coarser mesh screen 23. The backing screen of cloth 23 is of the roller flat-top type and of any coarse size such, for example, as three of four mesh. The mesh of the finer mesh wire screen 24 varies, in accordance with the separating job to be done. For example, the mesh of the fine wire screen or cloth 24 may vary from the order of minus 20 (−20) to the order of minus 325 (−325).

FIGS. 2A and 2B disclose a screen 30 as disclosed in U.S. Pat. 4,696,751 with a first mesh screen with rectangular dimensions of width and length. A second screen 38 is held in superimposed abutting relationship to the first screen 32. The second 38 has width and length dimensions. The length dimensions of the first screen is larger than length dimension of the second screen, and the width dimension of the first screen is smaller than the width dimension of the second screen.

FIGS. 3A and 3B disclose screens 50 and 53 shown in U.S. Pat. No. 5,626,234 which has an upper cloth 51 and lower cloth 52. The upper cloth 51 is formed from woven stainless steel wire in the range 0.19 mm to 0.036 mm diameter and 60–325 mesh, (i.e. number of strands per inch) while the lower cloth 52 is formed from woven phosphor bronze wire in the range 0.45 mm to 0.19 mm diameter and 20–40 mesh. A screen 53 in FIG. 3B has an upper cloth 54 like the upper cloth 51 (FIG. 3A) and a lower cloth 55 woven from stainless steel wire having a nominal diameter in the range 0.20 to 0.45 mm diameter and typical 30 mesh, and is coated with an epoxy based material, or Molybdenum Disulphide, or Teflon (Registered Trade Mark), to a thickness in the range 5 to 50 microns typically 20 to 40 microns. Multiple passes of the wire through a coating process or through a succession of such processes may be necessary to achieve the desired coating thickness. The wires 57, 58, 59 are shown in cross section to show the outer material coatings 67, 68, 69 (not to scale). The wire 64 is shown with the coating scraped from one end.

There has long been a need for a method for efficiently and effectively separating fluid and fibrous lost circulation materials from a mixture of them with drilled cuttings, debris, etc. There has long been a need, recognized by the present inventors, for such a method that does not result in clogged or plugged screen assemblies used for such separating.

SUMMARY OF THE PRESENT INVENTION

The present invention, in certain aspects, discloses a method for using a vibratory separator with one or more screen assemblies to separate fluid from a mixture of such fluid and fibrous lost circulation material that is pumped down a wellbore in an effort to remedy a lost circulation problem so that the fluid to be recoverd and the fibrous lost circulation material passes through the one or more screen assemblies and the drilled cuttings, etc. move off the top of the one or more screen assemblies. In one aspect such a method employs a screen or screen assembly that has at least one layer of screen mesh that has non-square openings, e.g. but not limited to non-square rectangular openings. Fluid flow across such a screen or screen assembly may be in the lengthwise direction of the non-square openings or transverse to the length. It is within the scope of the present invention to use any suitable known vibratory separation apparatus or shale shaker with one or more screen assemblies according to the present invention in methods according to the present invention.

In one particular aspect such a method employs a screen assembly with a lowermost screen of relatively large mesh, e.g. between 15 and 50 mesh; a middle screen of between 105×64 and 170×105 mesh (i.e. 105 openings in one direction, 64 openings in the other; 170 openings in one direction 105 openings in the other direction) with openings that are non-square rectangular openings between 333.4 and 178.4 microns long and between 198.7 and 106 microns wide; and a top mesh between 240×150 and 170×105 mesh with non-square rectangular openings that are about 136.3 to 72.8 microns wide and 198.7 to 106 microns long. Wire between about 0.016 to 0.0045 inches in diameter is used for the lowermost screen; between 0.0014 to 0.0025 inches in diameter for the middle screen; and between 0.0012 and 0.0018 inches in diameter for the top screen. Alternatively any screen pattern or weave with any wires disclosed herein may be used.

In certain aspects by using non-square rectangular openings a larger opening area is presented to a fiber than is presented by a square opening with a side equal to the width of the rectangular opening (i.e. the length of the non-square rectangular opening is longer than the length of the side of the square). A fiber caught on a wire and/or bridging such a non-square rectangular opening while connected to one or two wires or laying across two wires of such an opening, does not block flow through the non-square opening to the extent that such a fiber would block flow through the square opening, i.e. the percentage of area of the non-square opening blocked by the fiber is less than the percentage of the total area of the square opening that would be blocked by the fiber. In certain aspects in such a situation there may also be more fluid flow against such a fiber and past the fiber's surfaces when using the non-square openings as compared to the amount of such fluid flow through a square opening. Thus loosening and/or wash through of the fiber may be facilitated by using the non-square openings. Such facilitation may be further enhanced by flowing the fluid to be treated in the general direction of the length of the non-square rectangular openings.

In certain prior art screens that use square mesh openings fibrous lost circulation material can become trapped between the top two meshes of a screen. This is inhibited or reduced by using screens according to the present invention with non-square openings as described above.

It is contrary to the accepted teaching and skill in the art to use screens with the relatively large non-square openings to separate fluid from fibrous lost circulation materials. For those solids that are in a mixture to be treated and are to be moved off the top of the screen assemblies and that are generally spherical and therefore have a largest dimension, the width (not the length) of a rectangular opening determines if the solids will or will not pass through such an opening and the relatively longer length of the rectangular opening permits fibrous material to pass through with the fluid to be recovered that passes through the screen assemblies. To achieve this in certain aspects the middle or second from the top of a multi-layer screen assembly has oblong or rectangular openings (as viewed from above) to assist the passage of fibrous lost circulation material through the screen assembly and to speed the passage of such materials through the screen assembly so that they are not resident between screen layers a sufficient amount of time to cause plugging problems by swelling. In other aspects the top layer of screening material may also have such oblong or rectangular openings. Also, the length of the openings in the middle or second-from-the-top layer may be parallell to the lengths of the openings of the top layer or these lengths may be at right angles or at any desired angle to each other (as viewed from above).

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, non-obvious methods for separating fluid and fibrous lost circulating material from a mixture that includes drilled cuttings;

Such methods in which the clogging or plugging of screens of a vibratory separator is inhibited;

Such methods in which screens with non-square openings, e.g. generally oblong or rectangular openings, are used;

Such methods in which the resident time in a screen assembly of material that can swell is reduced and the passage of such material through the screen assembly is facilitated;

Such methods in which fluid flow is in the general direction of the length of the non-square openings (of either a top layer of screening material of a screen assembly or a layer below the top layer) or transverse thereto; and Such methods in which a multi-screen screen assembly is used.

The present invention, in certain aspects, discloses a screen with wires of varying diameter in a single screen cloth layer. In one aspect, alternate wires (e.g. but not limited to, every other wire, every third wire, every fourth wire, or every fifth wire) in a screen warp direction are of a larger diameter than the other wires of the screen. In other aspects, alternate wires (e.g. but not limited to, every other wire, every third wire, every fourth wire, or every fifth wire) in a screen shute direction are of a larger diameter than the other wires of the screen. Alternatively, all wires in a warp direction or in a shute direction may be of the larger diameter.

It is, therefore, an object of at least certain preferred embodiments of the present invention to provide:

New, useful, unique, efficient, non-obvious methods for screening lost circulation material with vibratory separators; and New, useful, unique, efficient, non-obvious vibratory separators (e.g. shale shakers) with such screens.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 6A is a top view of a screen according to the present invention. FIG. 6B is a cross-section view of the screen of FIG. 6A.

FIG. 7 is a perspective view of a screen according to the present invention.

FIG. 8 is a top view of a screen according to the present invention.

FIG. 9–13 are top views of screens according to the present invention.

DESCRIPTION OF EMBODIMENTS PREFERRED AT THE TIME OF FILING FOR THIS PATENT

Figure 1A:
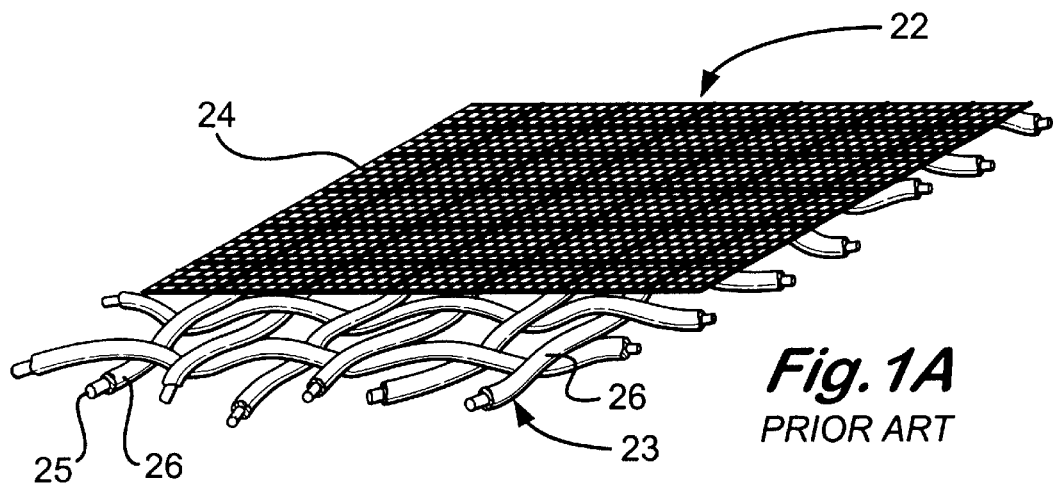
FIG. 1A is a perspective view of a prior art screen.

FIGS. 19A–19D show a screen assembly 210 according to the present invention which has a lowermost screen 212, a middle screen 214, and a top most screen 216. Any one of these three screens may be deleted. The screen assembly 210 may have any known side hookstrips; and/or any known screen support (indicated by numeral 213) including, but not limited to, support strips, frame, and/or supporting perforated plate (each of which is not the legal equivalent of the others). Any two adjacent or all three screens may be bonded or connected together in any known manner.

Figure 19A:
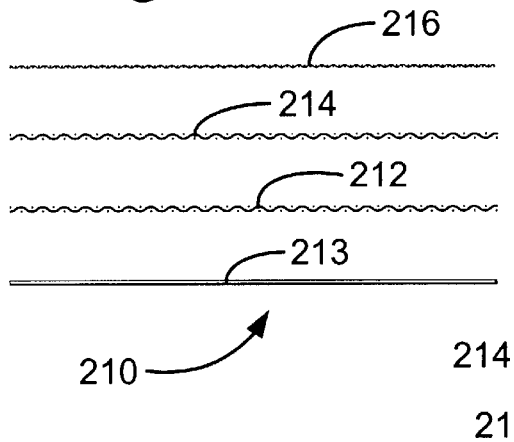
FIG. 19A is a side exploded view of a screen assembly according to the present invention.
Figure 19B:
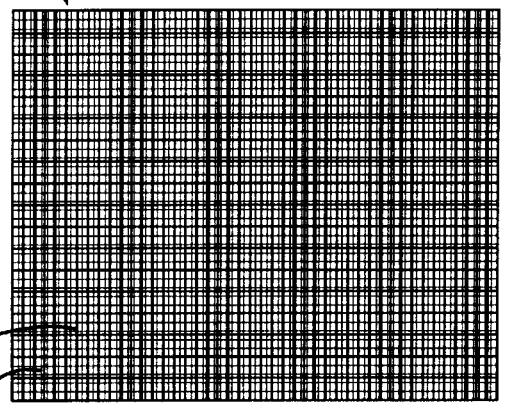
FIG. 19B is a top view of the screen assembly of FIG. 19A.
Figure 19C:
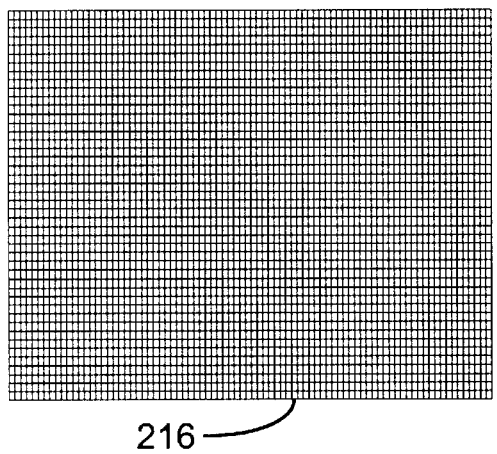
FIG. 19C is a top view of the top screen of the screen assembly of FIG. 19A.

The top screen 216 (see FIG. 19C) is woven of wires about 0.0012 to 0.0018 inches in diameter made of any suitable material, including but not limited to, metal, plastic, steel, and stainless steel, e.g. 304 or 316 SS. Any suitable known weave and weave pattern may be used. In the embodiment of FIG. 19C as viewed from above, the openings between intersecting wires are non-square and rectangular. In the embodiment shown the length of each rectangle is greater than the width. In certain aspects, the length of the rectangles is between two to two-and-a-half times the width of the rectangle; but any non-square rectangular shape may be used. Also, the non-square openings in a single screen may be of different size and dimensions. The wires may be made of any known screen material. In certain aspects the width of the rectangular openings is chosen so that drilled cuttings are separated on top of the screen assembly and are movable off the top of the screen without passing through the screen assembly and the fluid to be recoverd and fibrous lost circulation material passes through the screen assembly. The length of the rectangular openings is chosen so that the fibrous lost circulation material passes relatively speedily through the screen assembly and has insufficient time to swell between mesh layers and thus clog or plug the screen assembly.

Figure 19D:
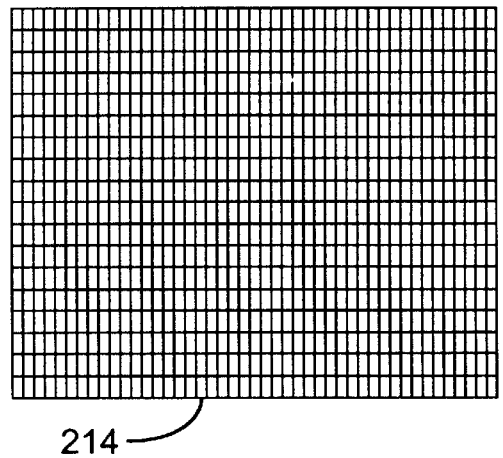
FIG. 19D is a top view of the middle screen of the screen assembly of FIG. 19A.

FIG. 19D shows the middle screen 214 is woven of wires about 0.0014 to 0.0025 inches in diameter made of the same material as the top screen. Any suitable known non-square weave and weave pattern may be used. In the embodiment of FIG. 19C as viewed from above, the openings between intersecting wires are non-square and rectangular. Any non-square rectangular shape may be used. Also, the non-square openings in a single screen may be of different size and dimensions. The wires may be made of any known screen material.

Figure 20:
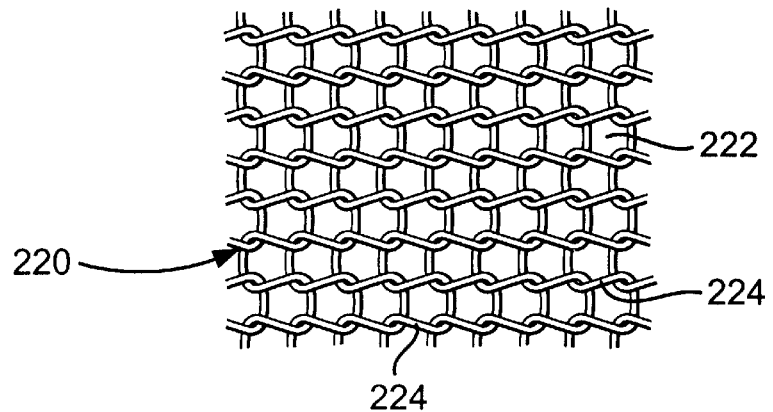
FIG. 20 is a top view of screening material for use in methods according to the present invention.

FIG. 20 shows a type of woven wire pattern 220 which has non-square openings 222 viewed from above that are not the equivalent of the non-square rectangular openings referred to above. The wire pattern 220 is made of any suitable wires 224 interlinked together. Wires with any diameter referred to above or any other suitable diameter may be used and the wire material may be any referred to above. Some or all of the wires may be bonded at points of intersection or various wires or areas of wires may be left loose so that some relative movement between adjacent wires is permitted. The size and dimensions of the openings through the pattern, as viewed from above, may be any desired size and dimensions. It is within the scope of this invention for any screen used in a multi-screen screen assembly for a vibratory separator to have a weave as in the pattern 220 in any of the aspects mentioned above and for such interlinked mesh to include all the surface area, part of it, or parts of it in a screen according to the present invention.

The general direction of fluid flow over any screen or screen assembly according to the present invention may be either in the direction of the length of the non-square openings (e.g. right to left or left to right for FIGS. 19C, 19D) or in the direction of the opening's width (top to bottom or vice versa in FIGS. 19C, 19D).

The present invention, therefore, provides in certain, but not necessarily all embodiments, a method for separating fluid and fibrous lost circulation material from a mixture thereof with drilled cuttings, the method including introducing the mixture onto a screen assembly that is vibrating for passage of the fluid and fibrous lost circulation material through the screen assembly and for separation of the drilled cuttings from the fluid, the screen assembly with a plurality of screens one on top of the other and including at least a first screen and a second screen, the first screen with a screen mesh woven with first non-square openings as viewed from above. Such a method may have one, some, or all of the following: wherein the first non-square openings of the first screen are non-square rectangular openings; wherein the second screen is a screen mesh woven with second non-square openings (e.g. rectangular) as viewed from above; wherein the first non-square openings are larger in area as viewed from above than the second non-square openings; wherein the screen assembly has a screen support; wherein the screen support includes a series of spaced-apart strips, a perforated plate, and/or a frame; wherein the mesh of the first screen is bonded to and/or mechanically connected to the mesh of the second screen; wherein the fluid is drilling fluid; wherein at least one of the first screen and second screen is bonded to the screen support; wherein at least one of the first screen and second screen is mechanically connected to the screen support; wherein the first non-square openings have a length and a width and the fluid flows on the screen in a direction generally parallel to the length of the first non-square openings; wherein the second non-square openings have a length and a width and the fluid flows on the screen in a direction generally parallel to the length of the second non-square openings; wherein the first non-square openings are generally rectangular and the second non-square openings are generally rectangular and, as viewed from above, lengths of the first non-square openings are transverse to lengths of the second non-square openings; wherein the first non-square openings are generally rectangular and the second non-square openings are generally rectangular and, as viewed from above, lengths of the first non-square openings are parallel to lengths of the second non-square openings; wherein the screen assembly includes at least one screen with at least a portion thereof comprising interlinked screening material; and/or wherein the screen assembly includes a third screen connected (e.g. bonded and/or mechanically connected) to at least one of the first and second screen, or to both of them.

Figure 4A:
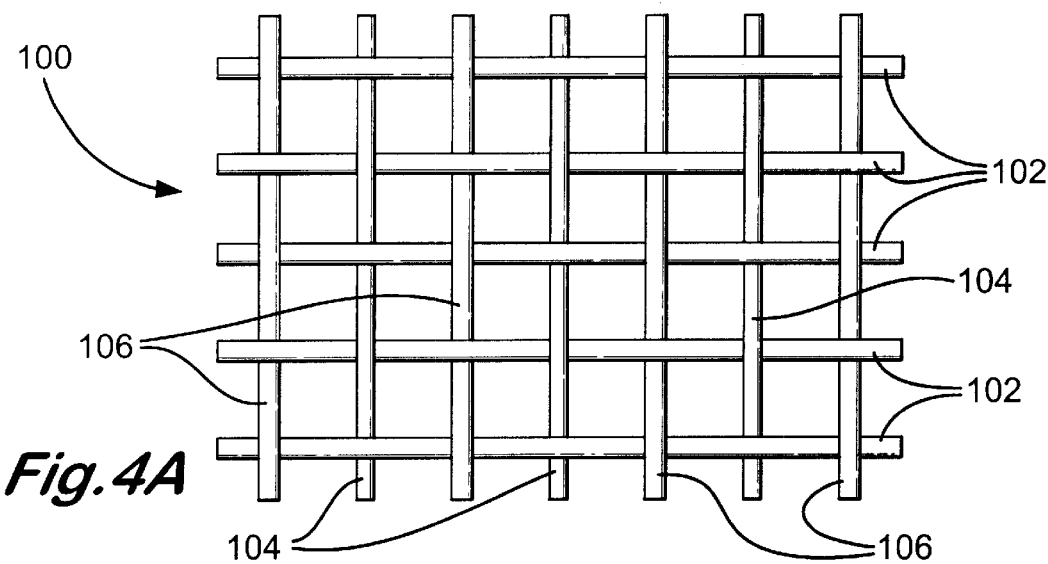
FIG. 4A is a top view of a screen according to the present invention.
Figure 4B:
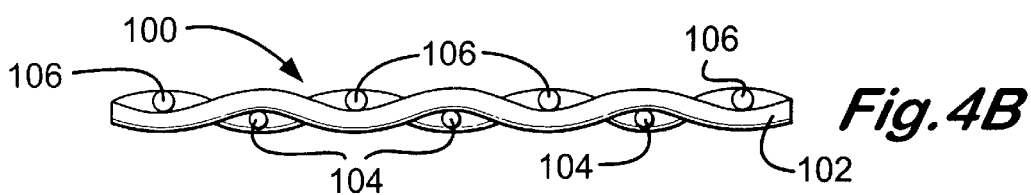
FIG. 4B is a cross-section view of the screen of FIG. 4A.

FIG. 4A shows a screen 100 according to the present invention for use in a vibratory separator, e.g., but not limited to, a shale shaker. The screen has a square mesh pattern with a plurality of wires 102 in one direction (shute direction) each of substantially the same cross-sectional diameter, e.g. ranging between about 0.0126 inches and about 0.0010 inches. The screen has a plurality of wires 104 in a direction orthogonal to that of the wires 102. The wires 104 have a cross-sectional diameter similar to that of the wires 102. Spaced-apart by the wires 104 and by space therebetween is a plurality of support wires 106 with a cross-sectional diameter larger than that of the wires 104. In certain embodiments the diameter of the wires 106 ranges between about 0.0126 inches and about 0.0010 inches. In certain aspects the diameter of the wires 106 is at least 1.15 times larger than the diameter of the wires 104.

Figure 5A:
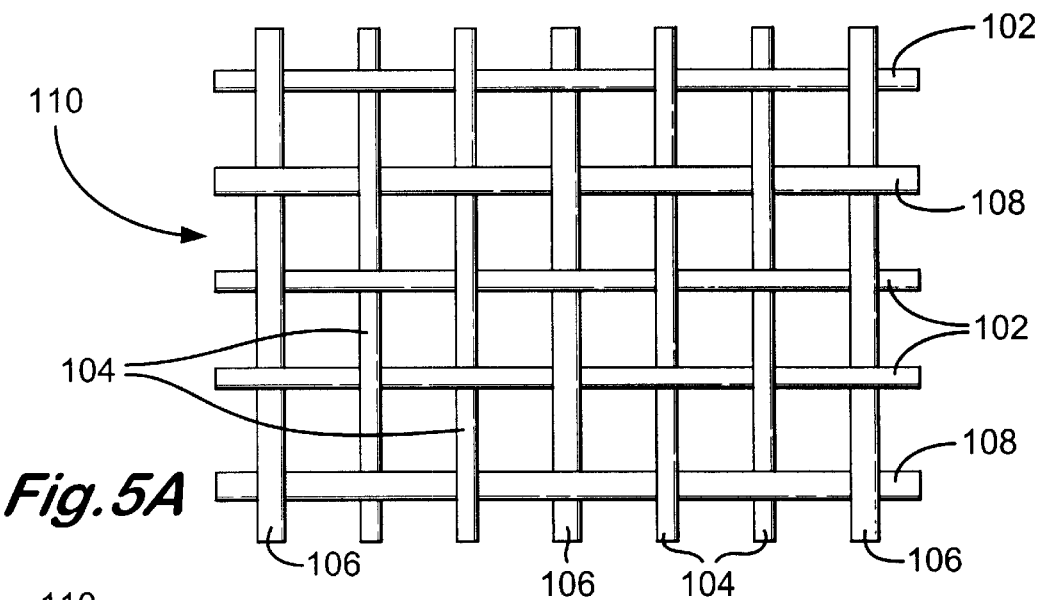
FIG. 5A is a top view of a screen according to the present invention.
Figure 5B:
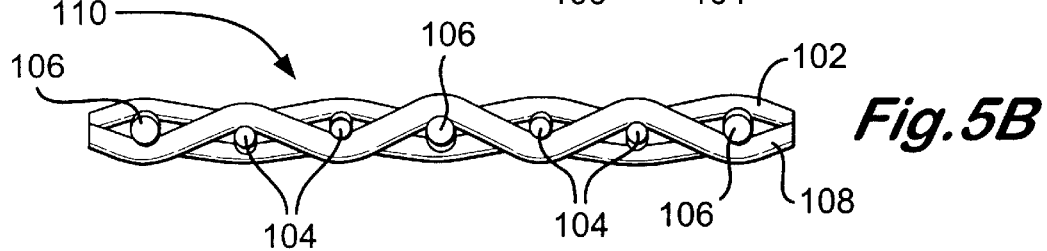
FIG. 5B is a cross-section view of the screen of FIG. 5A.

A screen 110 shown in FIGS. 5A and 5B is like the screen 100, but the larger diameter wires 106 are every third wire in the warp direction, rather than every other wire as in the screen 100. Also every third wire 108 in the shute direction is a larger diameter wire like the wires 106. The same numerals in FIGS. 4A and 5A indicate the same parts.

FIG. 6A shows a screen 120 according to the present invention with a twill mesh pattern with every third wire 126 (like the wires 106, FIG. 4A) in both directions of a larger diameter than the remaining wires 122 and 124 (like the wires 102, 104 respectively, FIG. 4A).

FIG. 7 shows a screen 130 with all larger diameter wires 136 (like the wires 106, FIG. 4A) in the shute direction and every other wire in the warp direction of larger diameter. Every other wire 134 in the warp direction is a smaller diameter wire (like the wires 102, 104, FIG. 4A).

FIG. 8 shows a screen 140 according to the present invention with a rectangular mesh pattern with every other wire in the warp direction a larger diameter wire 146 (like the wires 106, FIG. 4A) and smaller diameter wires 142 and 144 (like the wires 102, 104 respectively, FIG. 4A).

FIGS. 9–13 show screens 150, 151, 153, 155, and 157 respectively, each with a rectangular mesh pattern, with larger diameter wires 156 (like the wires 106, FIG. 4A) and smaller diameter wires 152, 154 (like the wires 102, 104 respectively, FIG. 4A).

Figure 1B:
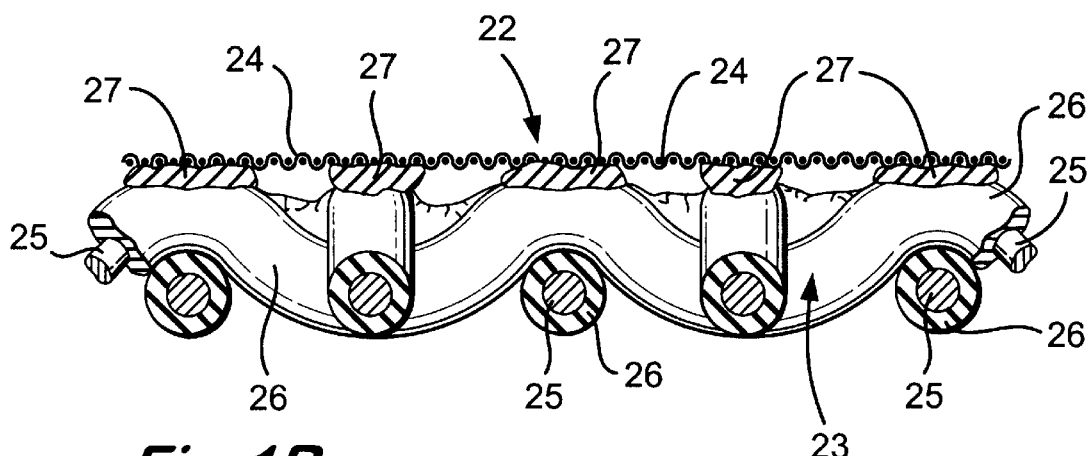
FIG. 1B is a cross-section view of the screen of FIG. 1A.
Figure 14:
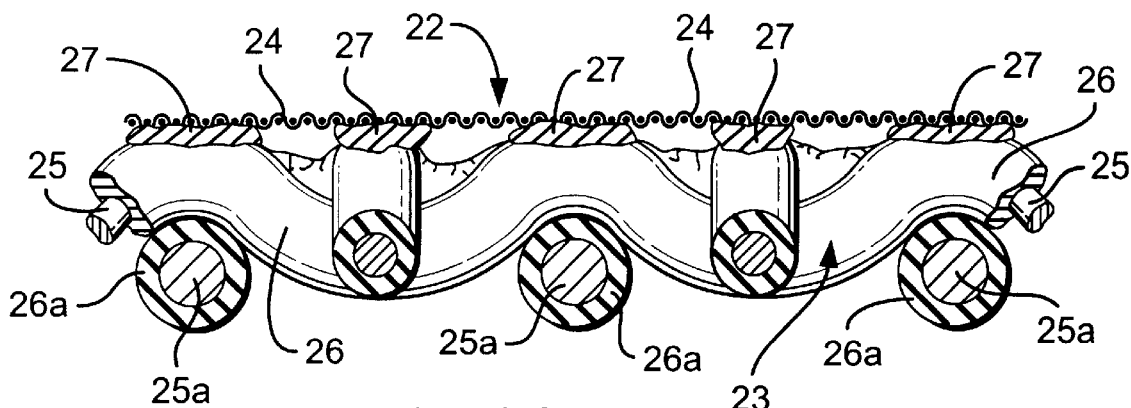
FIG. 14 is a cross-section view of a screen according to the present invention.

FIG. 14 shows a screen 160 according to the present invention like the screen of U.S. Pat. No. 2,723,032, but with alternating larger diameter wires 25a instead of the wires 25 as shown in FIGS. 1A–1B. The coating 26a is larger than the coating 26 shown in FIG. 1B. It is also within the scope of this invention for the upper screen layer of the screen 22 to be of any screen material according to the present invention.

Figure 2A:
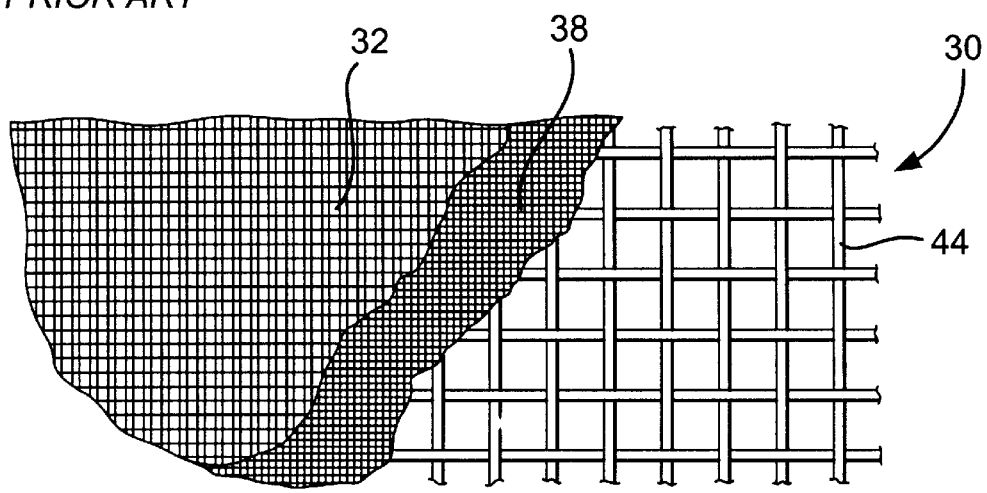
FIG. 2A is a top view, partially cut away of a prior art screen.
Figure 2B:
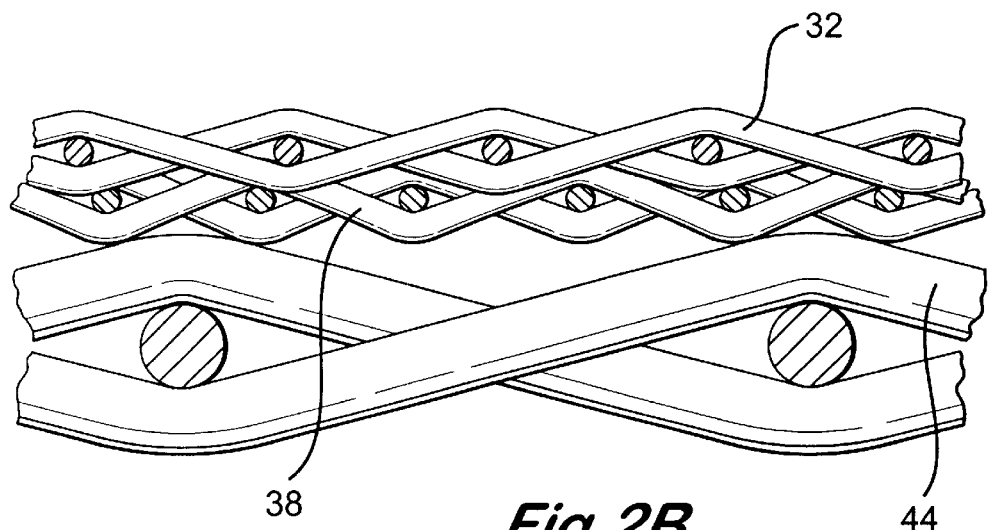
FIG. 2B is a cross-section view of the screen of FIG. 2A.
Figure 15:
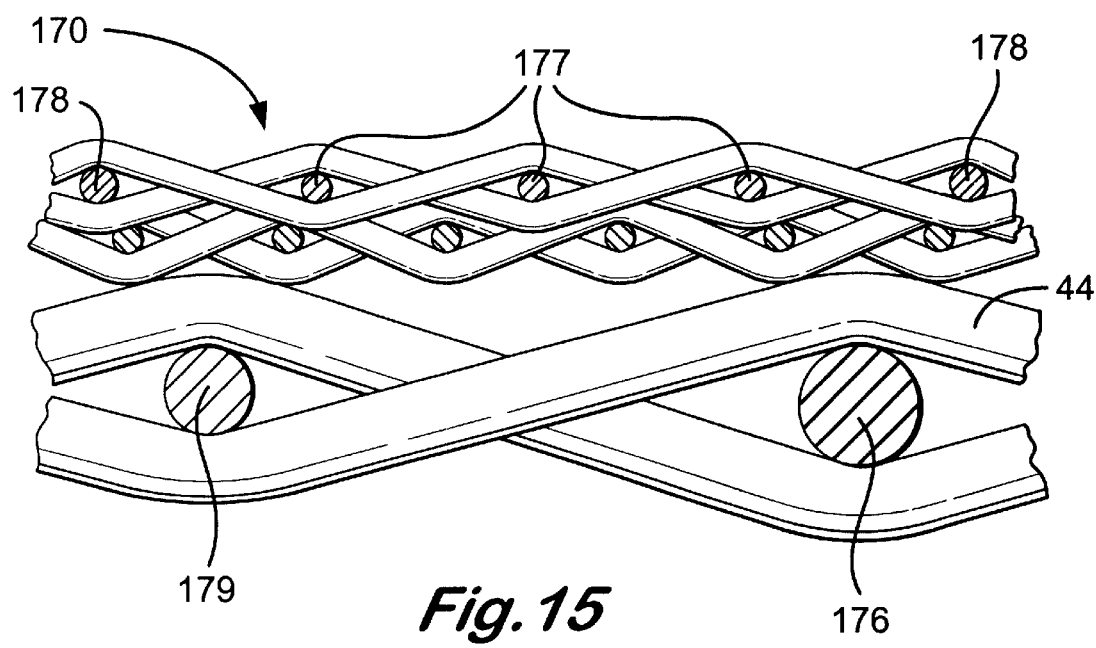
FIG. 15 is a cross-section view of a screen according to the present invention.

FIG. 15 shows a screen 170 according to the present invention like the screen of U.S. Pat. No. 4,696,751 (incorporated fully herein for all purposes) (FIGS. 2A and 2B), but with larger diameter wires 176 (every other wire) between the wires 179 [in the layer 44 (FIGS. 2A, 2B)] and with every fourth wires 178 in the top layer of screen material larger in cross-sectional diameter than the remaining wires 177 in that layer. The wires 176 may be eliminated; the layer 44 may be eliminated; and/or the wires 178 may be eliminated—all according to the present invention. It is also within the scope of the present invention to use any screening material disclosed herein for any of the fine screening layers of the screen 170.

Figure 3A:
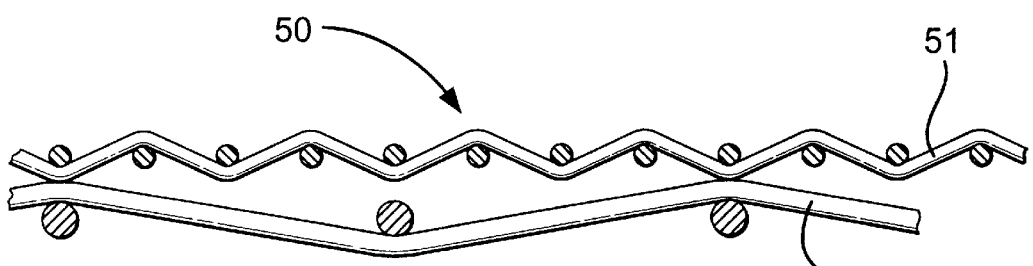
FIG. 3A is a cross-section view of a prior art screen.
Figure 3B:
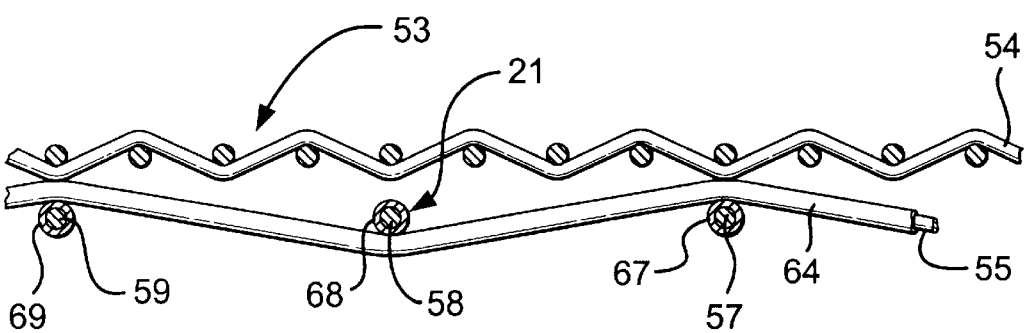
FIG. 3B is a cross-section view of a prior art screen.
Figure 16:
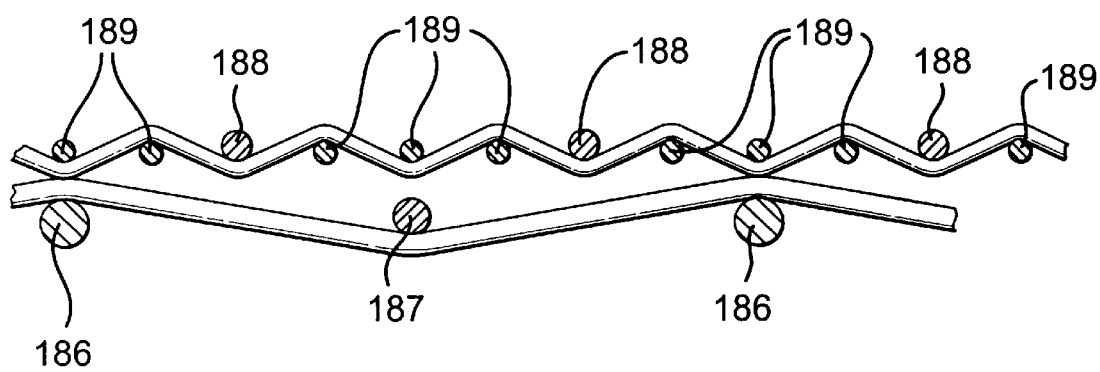
FIG. 16 is a cross-section view of a screen according to the present invention.

FIG. 16 shows a screen 180, like the screen of U.S. Pat. No. 5,626,234 (incorporated fully herein for all purposes) shown in FIG. 3A, but with larger diameter wires 186 in the lower screening layer between smaller diameter wires 187 and larger diameter wires 188 in the upper screening layer between smaller diameter wires 189. Either plurality of larger diameter wires may be eliminated and the lower layer of screening material may be eliminated.

Figure 17A:
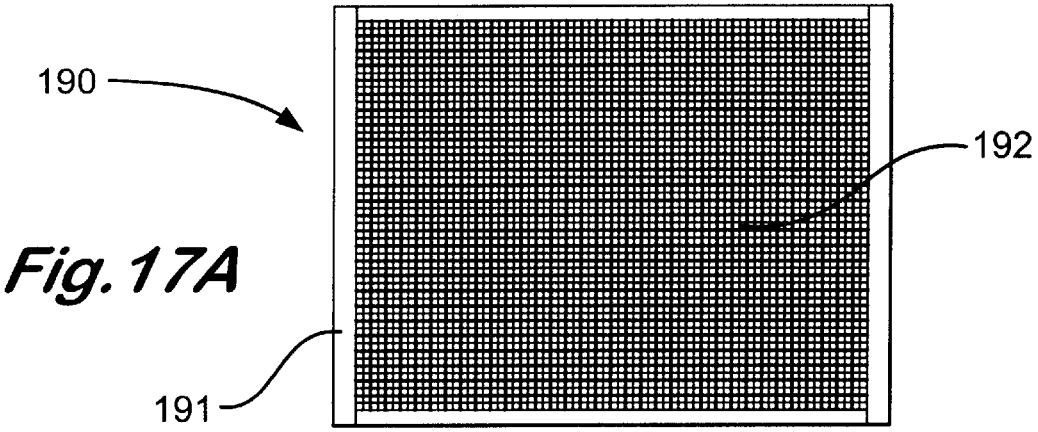
FIG. 17A is a cross-section view of a screen according to the present invention.
Figure 17B:
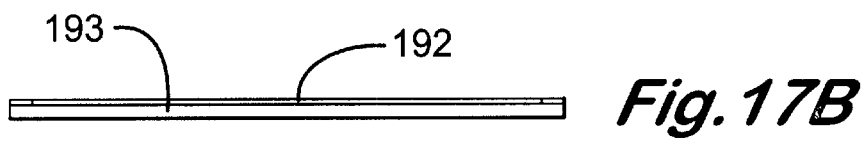
FIG. 17B is a side view of the screen of FIG. 17A.

FIGS. 17A and 17B show a screen 190 according to the present invention with an optional outer frame 191 (like any frame disclosed in the prior art) with screening material 192 mounted thereto (like any screening material according to the present invention disclosed herein). Item 193 shown schematically in FIG. 17B indicates any known lower supporting apertured plate, perforated plate, series of straps or strips, strip member or coarse supporting mesh, which is optional for the screen 190. It is within the scope of this invention to have additional layers of screening material (one, two or more) according to the present invention above or below the layer of screening material 192. Any screen 190 with two or more layers of screening material may have the layers interconnected, bonded to each other, and/or sintered together in any known manner. Any known hookstrip (e.g. angled, L-shaped, C-shaped, etc.) may be used with the screen 190 and with any screen according to the present invention.

Figure 18:
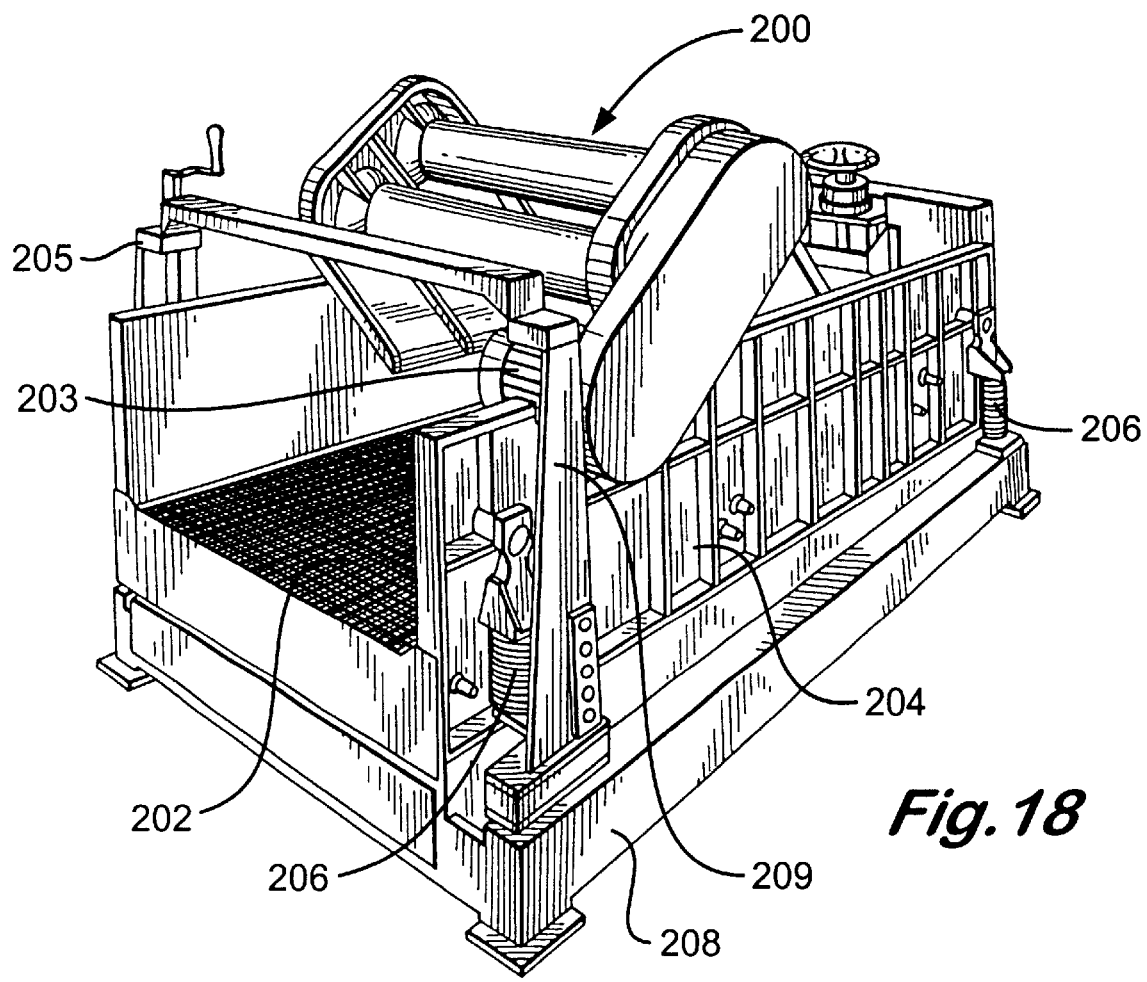
FIG. 18 is a perspective view of a shale shaker with a screen according to the present invention.

FIG. 18 shows a vibratory separator system 200 according to the present invention that has a screen 202 (like any screen disclosed herein) according to the present invention mounted on vibratable screen mounting apparatus or "basket" 204. The screen 202 may be any screen disclosed herein or have any combination of any feature or features of any screen or screen part disclosed herein; and any such screen may be used with any appropriate shaker or screening apparatus. The basket 204 is mounted on springs 206 (only two shown; two as shown are on the opposite side) which are supported from a frame 208. The basket 204 is vibrated by a motor 203 and interconnected vibrating apparatus 209 which is mounted on the basket 204 for vibrating the basket and the screens. Elevator apparatus 205 provides for raising and lowering of the basket end.

For any screen according to the present invention the warp wires and/or shute wires and/or support wires may be made from material from the group consisting of metal, steel, stainless steel, copper, bronze, brass, aluminum, aluminum alloy, zinc, zinc alloy, platinum, titanium, plastic, fiberglass, and polytetrafluoroethylene.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A method for separating fluid from a mixture of fluid and fibrous lost circulation material, the method comprising
introducing the mixture onto a screen assembly that is vibrating for passage of the fluid through the screen assembly for separation from the mixture, the screen assembly comprising a plurality of screens one on top of the other and including at least a first screen and a second screen, the first screen comprising a first mesh woven with first non-square openings as viewed from above, wherein the first non-square openings of the first screen are non-square rectangular openings, and the first screen's first mesh between 240×150 mesh and 170×105 mesh with non-square rectangular openings that are about 136.3 to 72.8 microns wide and 198.7 to 106 microns long, the first mesh made from wires between 0.0012 and 0.0018 inches in diameter for the top screen and the length of the non-square rectangular openings is two to two and one half times the width thereof, and the screen assembly facilitating wash-through of fibers of the fibrous lost circulation material through the first screen's non-square openings.

2. The method of claim 1 wherein the second screen comprises a second mesh woven with second non-square openings as viewed from above, the second mesh between 105×64 mesh and 170×105 mesh with openings that are non-square rectangular openings between 333.4 and 178.4 microns long and between 198.7 and 106 microns wide, and the second mesh made from wires that are between 0.0014 to 0.0025 inches in diameter, and the method further comprising facilitating wash-through of fibers of the fibrous lost circulation material through the second screen's non-square openings.

3. The method of claim 2 wherein the first non-square openings are larger in area as viewed from above than the second non-square openings.

4. The method of claim 1 wherein the screen assembly has a screen support from the group consisting of a series of spaced-apart strips, a perforated plate, and a frame.

5. The method of claim 1 wherein the mesh of the first screen is attached to the second screen by an attachment method from the group consisting of bonding, mechanically connection, and gluing.

6. The method of claim 1 wherein the first non-square openings have a length and a width and the fluid flows on the screen in a direction generally parallel to the length of the first non-square openings.

7. The method of claim 2 wherein the second non-square openings have a length and a width and the fluid flows on the screen in a direction generally parallel to the length of the second non-square openings.

8. The method of claim 2 wherein lengths of the first non-square openings are transverse to lengths of the second non-square openings.

9. The method of claim 2 lengths of the first non-square openings are parallel to lengths of the second non-square openings.

10. The method of claim 1 wherein the screen assembly includes at least one screen with at least a portion thereof comprising interlinked screening material.

11. The method of claim 1 wherein the screen assembly includes a third screen connected to at least one of the first and second screen.

12. A method for separating fluid from a mixture of fluid and fibrous lost circulation material, the method comprising introducing the mixture onto a screen assembly that is vibrating for passage of the fluid through the screen assembly and for separation of fibrous lost circulation material from the fluid, the screen assembly comprising a plurality of screens one on top of the other and including at least a first screen on top of a second screen, the first screen comprising a plurality of first warp wires and a plurality of first shute wires, the first warp wires interwoven with the first shute wires, and a plurality of spaced-apart first support wires interwoven with the first shute wires, the first support wires having a diameter greater than a diameter of the first warp wires, the second screen comprising a plurality of second warp wires and a plurality of second shute wires, the second warp wires interwoven with the second shute wires, and a plurality of second spaced-apart support wires interwoven with the second shute wires, the second support wires having a diameter greater than a diameter of the second warp wires, and the first support wires having a diameter less than the second support wires.

13. The method of claim 12 wherein the first screen comprises a screen mesh woven with first non-square openings as viewed from above, wherein the first non-square openings of the first screen are non-square rectangular openings, wherein the second screen comprises a screen mesh woven with second non-square openings as viewed from above, wherein the second non-square openings of the second screen are non-square rectangular openings.

14. The method of claim 13 wherein the first non-square openings are larger in area as viewed from above than the second non-square openings, wherein the screen assembly has a screen support, wherein the mesh of the first screen is mechanically connected to the mesh of the second screen, wherein the first non-square openings have a length and a width and the fluid flows on the screen in a direction generally parallel to the length of the first non-square openings, wherein the second non-square openings have a length and a width and the fluid flows on the screen in a direction generally parallel to the length of the second non-square openings, and wherein the screen assembly includes a third screen connected to at least one of the first and second screen.

15. A method for separating fluid from a mixture of fluid and fibrous lost circulation material, the method comprising introducing the mixture to a vibratory separator system, the vibratory separator comprising a vibratory separator and a screen assembly, the screen assembly comprising a plurality of screens one on top of the other and including at least a first screen and a second screen, the first screen comprising a first mesh woven with first non-square openings as viewed from above, wherein the first non-square openings of the first screen are non-square rectangular openings, and the first screen's mesh between 240×150 mesh and 170×105 mesh with non-square rectangular openings that are about 136.3 to 72.8 microns wide and 198.7 to 106 microns long, the first mesh made from wires between 0.0012 and 0.0018 inches in diameter for the top screen and the length of the non-square rectangular openings is two to two and one half times the width thereof, and the screen assembly facilitating wash-through of fibers of the fibrous lost circulation material through the first screen's non-square openings.

16. The method of claim 15 wherein the vibratory separator system includes the second screen comprising a second mesh woven with second non-square openings as viewed from above, the second mesh between 105×64 and 170×105 mesh with openings that are non-square rectangular openings between 333.4 and 178.4 microns long and between 198.7 and 106 microns wide, and the second mesh made from wires that are between 0.0014 to 0.0025 inches in diameter.

17. The method of claim 16 wherein the first screen comprises a plurality of first warp wires and a plurality of first shute wires, the first warp wires interwoven with the first shute wires, and a plurality of spaced-apart first support wires interwoven with the first shute wires, the first support wires having a diameter greater than a diameter of the first warp wires, the second screen comprises a plurality of second warp wires and a plurality of second shute wires, the second warp wires interwoven with the second shute wires, and a plurality of second spaced-apart support wires interwoven with the second shute wires, the second support wires having a diameter greater than a diameter of the second warp wires, and the first support wires have a diameter less than the second support wires.

* * * * *